United States Patent
Jenkins et al.

(10) Patent No.: US 11,507,115 B2
(45) Date of Patent: Nov. 22, 2022

(54) CONTINGENT USE OF COMMANDED SPEED IN LIEU OF SENSED AIRSPEED TO INFORM FLIGHT CONTROL DECISIONS

(71) Applicant: WING Aviation LLC, Mountain View, CA (US)

(72) Inventors: Kevin Jenkins, Dallas, TX (US); Brandon Jones, Redwood City, CA (US)

(73) Assignee: WING Aviation LLC, Mountain View, CA (US)

( * ) Notice: Subject to any disclaimer, the term of this patent is extended or adjusted under 35 U.S.C. 154(b) by 339 days.

(21) Appl. No.: 16/597,338

(22) Filed: Oct. 9, 2019

(65) Prior Publication Data

US 2021/0109550 A1    Apr. 15, 2021

(51) Int. Cl.
| | | |
|---|---|---|
| G05D 1/10 | (2006.01) | |
| B64C 29/00 | (2006.01) | |
| B64C 39/02 | (2006.01) | |
| G05D 1/08 | (2006.01) | |

(52) U.S. Cl.
CPC ............ *G05D 1/106* (2019.05); *B64C 29/00* (2013.01); *B64C 39/024* (2013.01); *G05D 1/0833* (2013.01); *B64C 2201/141* (2013.01); *B64C 2201/146* (2013.01); *B64C 2201/162* (2013.01)

(58) Field of Classification Search
None
See application file for complete search history.

(56) References Cited

U.S. PATENT DOCUMENTS

| 9,902,494 | B2 | 2/2018 | Morris | |
|---|---|---|---|---|
| 10,513,341 | B2 * | 12/2019 | Jenkins | G05D 1/042 |
| 10,562,623 | B1 * | 2/2020 | Sloan | B64C 13/18 |
| 2007/0215748 | A1 * | 9/2007 | Robbins | B64C 29/0066 244/12.5 |
| 2008/0243371 | A1 * | 10/2008 | Builta | G05D 1/0202 244/195 |
| 2009/0114764 | A1 | 5/2009 | Builta et al. | |
| 2011/0184592 | A1 * | 7/2011 | Elias | G01C 23/00 701/7 |
| 2013/0030607 | A1 * | 1/2013 | Schulte | G05D 1/0061 701/2 |
| 2017/0334559 | A1 | 11/2017 | Bouffard et al. | |
| 2018/0032077 | A1 | 2/2018 | Moon et al. | |

FOREIGN PATENT DOCUMENTS

| EP | 1307797 B1 | 5/2003 |
|---|---|---|
| EP | 1924492 B1 | 5/2008 |
| EP | 1949195 B1 | 7/2008 |

OTHER PUBLICATIONS

International Search Report and Written Opinion, dated Dec. 30, 2020, in corresponding International Patent Application No. PCT/US2020/53416, 8 pages.

* cited by examiner

*Primary Examiner* — Aniss Chad
*Assistant Examiner* — Mahmoud M Kazimi
(74) *Attorney, Agent, or Firm* — Christensen O'Connor Johnson Kindness PLLC

(57) ABSTRACT

A technique for controlling an unmanned aerial vehicle (UAV) includes monitoring a sensed airspeed of the UAV, obtaining a commanded speed for the UAV, wherein the commanded speed representing a command to fly the UAV at a given speed relative to an airmass or to Earth, and when the commanded speed is greater than the sensed airspeed, using the commanded speed in lieu of the sensed airspeed to inform flight control decisions of the UAV.

20 Claims, 5 Drawing Sheets

CONTINGENT USE OF COMMANDED SPEED IN LIEU OF SENSED AIRSPEED TO INFORM FLIGHT CONTROL DECISIONS

TECHNICAL FIELD

This disclosure relates generally to aerial vehicles, and in particular but not exclusively, relates to control systems for unmanned aerial vehicles (UAVs).

BACKGROUND INFORMATION

An unmanned vehicle, which may also be referred to as an autonomous vehicle, is a vehicle capable of travel without a physically-present human operator. An unmanned vehicle may operate in a remote-control mode, in an autonomous mode, or in a partially autonomous mode.

When an unmanned vehicle operates in a remote-control mode, a pilot or driver that is at a remote location can control the unmanned vehicle via commands that are sent to the unmanned vehicle via a wireless link. When the unmanned vehicle operates in autonomous mode, the unmanned vehicle typically moves based on pre-programmed navigation waypoints, dynamic automation systems, or a combination of these. Further, some unmanned vehicles can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of unmanned vehicles exist for various different environments. For instance, unmanned vehicles exist for operation in the air, on the ground, underwater, and in space. Unmanned aerial vehicles (UAVs) or drones are becoming more popular in general. As their designs are refined and their capabilities expanded, their suitability for commercial use is expected to expand. Designs that improve the efficiency, stability, reliability, and/or endurance of UAVs will expand their mission capabilities.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Embodiments of a system, apparatus, and method of operation for contingent use of a commanded speed in lieu of a sensed airspeed to inform flight control decisions are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For aerial vehicles, such as unmanned aerial vehicles (UAVs), it is conventional to use airspeed, as measured from an onboard sensor (e.g., pitot probe), to inform flight control decisions. These decisions may include scheduling gains via the application of thrust with one or more propulsion units or allocating control effort applied via control surfaces (e.g., rudder, aileron, etc.). However, in circumstances where airspeed cannot be reliably obtained because the airspeed sensor is unable to make appropriate measurements of airspeed, it may be beneficial to perform the flight control decisions based on other information.

Figure 4A:
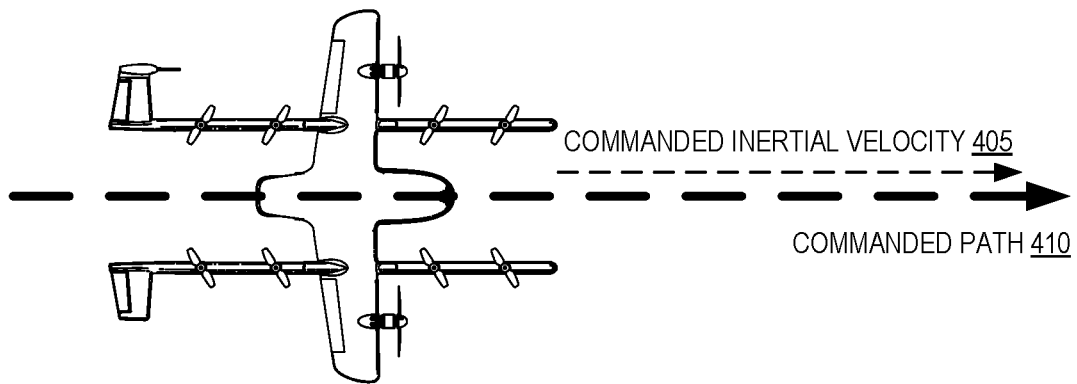
FIG. 4A illustrates a UAV having a forward axis that is aligned with a commanded path, in accordance with an embodiment of the disclosure.

In exceptional circumstances, the inability to accurately measure airspeed may be due to a failed airspeed sensor. However, in more common scenarios, this may be due to misalignment between the aerial vehicle's forward aerodynamic axis (also referred to herein as the vehicle's x-axis) and its flight vector (direction of inertial movement relative to Earth's frame of reference). Typically, the airspeed sensor is mounted to the aerial vehicle in an orientation that measures airspeed along its forward aerodynamic axis. During regular flight orientations, the aerodynamic surfaces on the aerial vehicle cause a weathervane effect that aligns the forward aerodynamic axis of the aerial vehicle with its flight vector (see FIG. 4A), resulting in an accurate airspeed measurement. However, an aerial vehicle may enter flight modes where the forward aerodynamic axis of the aerial vehicle is not well aligned with its flight vector (see FIG. 4B). This is particularly true for vertical takeoff and landing (VTOL) vehicles when transitioning between a hover mode and cruising mode. This misalignment is usually short lived during the transition. However, in certain scenarios, the aerial vehicle may become unable to obtain sufficiently good airspeed measurements to facilitate an exit from the misaligned state, resulting in a lack of control authority, if control allocations are performed based on these airspeed measurements. As such, the aerial vehicle may become unable to accurately schedule gains and allocate control effort to exit this trapped state. Accordingly, embodiments described herein provide for a contingent use of a "commanded speed" in lieu of a "sensed airspeed" to inform flight control decisions. In one embodiment, the commanded speed is used as a reference point, such that quantities of thrust and torque applied are appropriate for the airspeed at which the aerial vehicle is being commended to travel, rather than its measured or estimated speed. The commanded speed may be specified relative to the airmass through which the aerial vehicle is flying or relative to Earth over which the aerial vehicle is flying.

Figure 1:
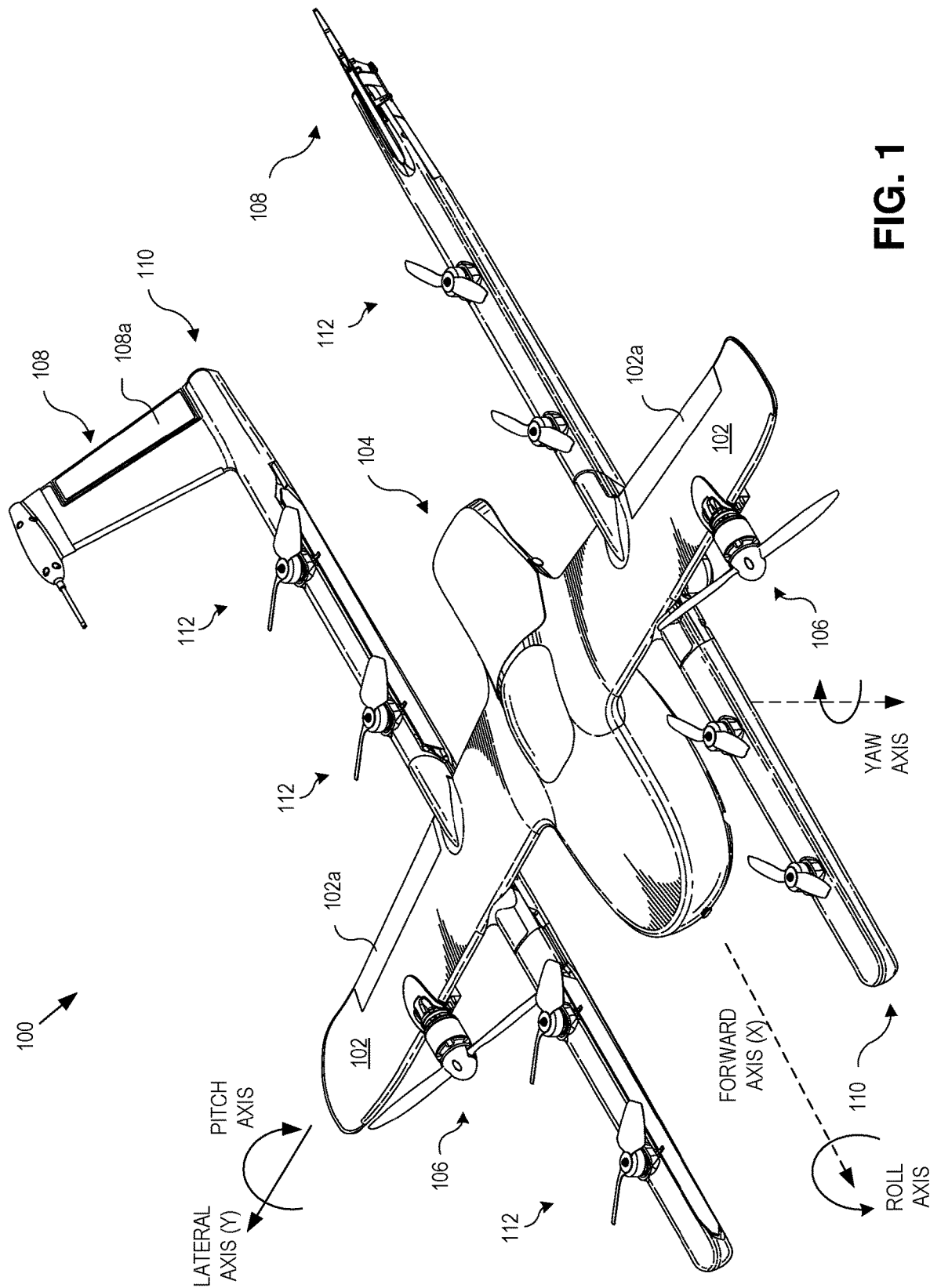
FIG. 1 is a perspective view illustration of an unmanned aerial vehicle (UAV), in accordance with an embodiment of the disclosure.

FIG. 1 is a perspective view illustration of an aerial vehicle 100, in accordance with an embodiment of the disclosure. The illustrated embodiment of aerial vehicle 100 is a VTOL unmanned aerial vehicle (UAV) that includes separate propulsion units 106 and 112 for providing horizontal and vertical propulsion, respectively. Aerial vehicle 100 is a fixed-wing aerial vehicle, which as the name implies, has a wing assembly 102 that can generate lift based on the wing shape and the vehicle's forward airspeed when propelled horizontally by propulsion units 106.

The illustrated embodiment of aerial vehicle 100 has an airframe that includes a fuselage 104, wing assembly 102, and boom assemblies 110. In one embodiment, fuselage 104 is modular and includes a battery module, an avionics module, and a mission payload module. These modules may be detachable from each other and mechanically securable to each other to contiguously form at least a portion of the fuselage or main body.

The battery module includes a cavity for housing one or more batteries for powering aerial vehicle 100. The avionics module houses flight control circuitry of aerial vehicle 100, which may include a processor and memory, communication electronics and antennas (e.g., cellular transceiver, wife transceiver, etc.), and various sensors (e.g., global positioning sensor, an inertial measurement unit (IMU), a magnetic compass, etc.). The mission payload module houses equipment associated with a mission of aerial vehicle 100. For example, the mission payload module may include a payload actuator for holding and releasing an externally attached payload. In another embodiment, the mission payload module may include a camera/sensor equipment holder for carrying camera/sensor equipment (e.g., camera, lenses, radar, lidar, pollution monitoring sensors, weather monitoring sensors, etc.). An airspeed sensor (e.g., pitot probe) may be mounted in a variety of locations on the airframe to measure airspeed along the forward axis or x-axis of the airframe.

As illustrated, aerial vehicle 100 includes horizontal propulsion units 106 positioned on wing assembly 102, which can each include a motor, a motor rotor with shaft, and propeller blades, for propelling aerial vehicle 100 horizontally. The illustrated embodiment of aerial vehicle 100 further includes two boom assemblies 110 that secure to wing assembly 102. Vertical propulsion units 112 are mounted to boom assemblies 110. Vertical propulsion units 112 can each also include a motor, a motor rotor with shaft, and propeller blades, for providing vertical propulsion. Vertical propulsion units 112 may be used during a hover mode where aerial vehicle 100 is descending (e.g., to a delivery location), ascending (e.g., following a delivery), or maintaining a constant altitude. Stabilizers 108 (or tails) may be included with aerial vehicle 100 to control pitch and stabilize the aerial vehicle's yaw (left or right turns) during cruise. In some embodiments, during cruise vertical propulsion units 112 are disabled and during hover horizontal propulsion units 106 are disabled. In other embodiments, vertical propulsion units 112 are merely powered low during cruise mode and/or horizontal propulsion units 106 are merely powered low during hover mode.

During flight, aerial vehicle 100 may control the direction and/or speed of its movement by controlling its pitch, roll, yaw, and/or altitude. Thrust from horizontal propulsion units 106 is used to control air speed as scheduled gains. The stabilizers 108 may include one or more rudders 108a for controlling the aerial vehicle's yaw, and wing assembly 102 may include elevators for controlling the aerial vehicle's pitch and/or ailerons 102a for controlling the aerial vehicle's roll. Control effort may be allocated via these control surfaces. As another example, increasing or decreasing the speed of all the propeller blades simultaneously can result in aerial vehicle 100 increasing or decreasing its altitude, respectively.

Many variations on the illustrated fixed-wing aerial vehicle are possible. For instance, aerial vehicles with more wings (e.g., an "x-wing" configuration with four wings), are also possible. Although FIG. 1 illustrates one wing assembly 102, two boom assemblies 110, two horizontal propulsion units 106, and four vertical propulsion units 112 per boom assembly 110, it should be appreciated that other variants of aerial vehicle 100 may be implemented with more or less of these components. Furthermore, the control techniques described herein are not limited to use with only VTOLs or UAVs, but rather these control techniques may be applicable to other types of aerial vehicles as well.

It should be understood that references herein to an "unmanned" aerial vehicle or UAV can apply equally to autonomous and semi-autonomous aerial vehicles. In a fully autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator may control high level navigation decisions for a UAV, such as specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

Figure 2:
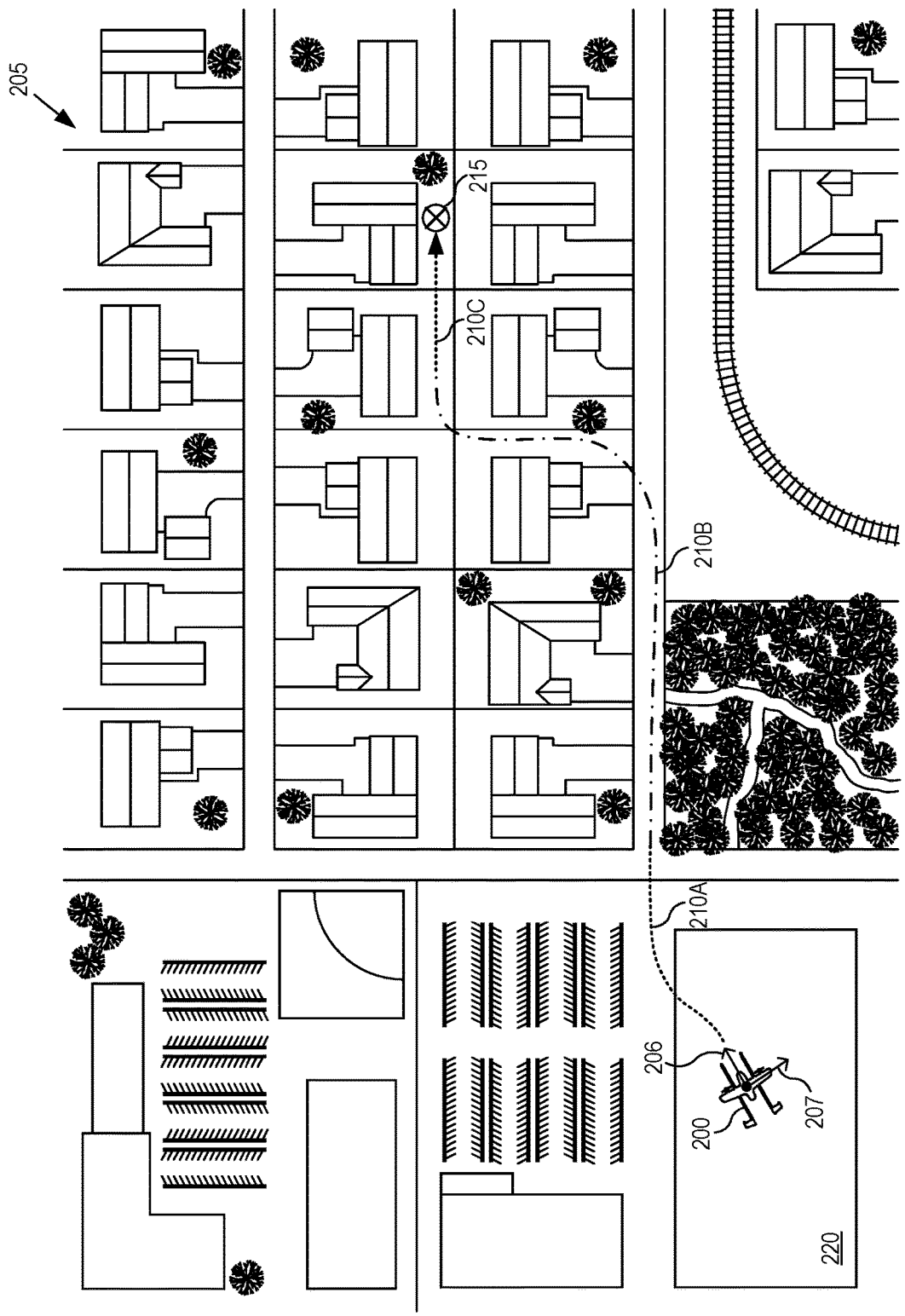
FIG. 2 illustrates a UAV navigating a drone mission having hover and cruise segments along a flight path, in accordance with an embodiment of the disclosure.

FIG. 2 illustrates a UAV 200 navigating a drone mission over a neighborhood 205 along a flight path including hover segments 210A and 210C and a cruise segment 210B. UAV 200 may be implemented by aerial vehicle 100, in one embodiment. The flight path is traversed by UAV 200 in response to a commanded path generated by a mission manager. The commanded path is the path that UAV 200 is commanded to follow by a control system, while the flight path is the actual path executed. In an ideal situation, these two paths are coincident, though in reality these paths may slightly deviate as the control system of UAV 200 strives to execute the commanded path despite real world influences like wind, turbulence, aerodynamic drag, rain, etc. The drone mission includes acceleration during hover segment 210A, a constant velocity during cruising segment 210B, and deacceleration to a destination 215 during hover segment 210C.

UAV 200 commences its drone mission from a staging area 220 in a hover mode to traverse hover segment 210A. During the hover mode, UAV 200 starts at a ground elevation, rises up to a cruising altitude, and then accelerates to a cruising speed before fully transitioning to a cruising mode for the cruising segment 210B of the flight path. In some embodiments, the cruising speed is a fixed value (e.g., 50 mph). The fixed value may be selected based upon the design/type of UAV 200, the range of the particular drone mission, the weight/drag of a payload, battery constraints, or other factors and considerations. The fixed value, when used for airspeed tracking, is an airspeed at which the aircraft is expected to travel. The fixed value may be used to select gains and control allocations appropriate for such a speed.

In a typical scenario, wind drag on the aerodynamic surfaces of UAV 200 orients forward axis 206 of UAV 200 along the commanded path (see also FIG. 4A) as UAV 200 accelerates to the cruising speed. However, in certain environmental situations, UAV 200 may end up misaligned from the commanded path (e.g., see FIG. 4B) such that lateral axis 207 tilts towards the commanded path. In this misalignment orientation, the onboard airspeed sensor may not accurately reflect true airspeed due to misalignment of the sensor to the direction of travel through the airmass. As such, the flight control system may not receive sufficiently accurate feedback from onboard sensors to regain control authority, thus becoming trapped in this misaligned and inefficient state.

Figure 3:
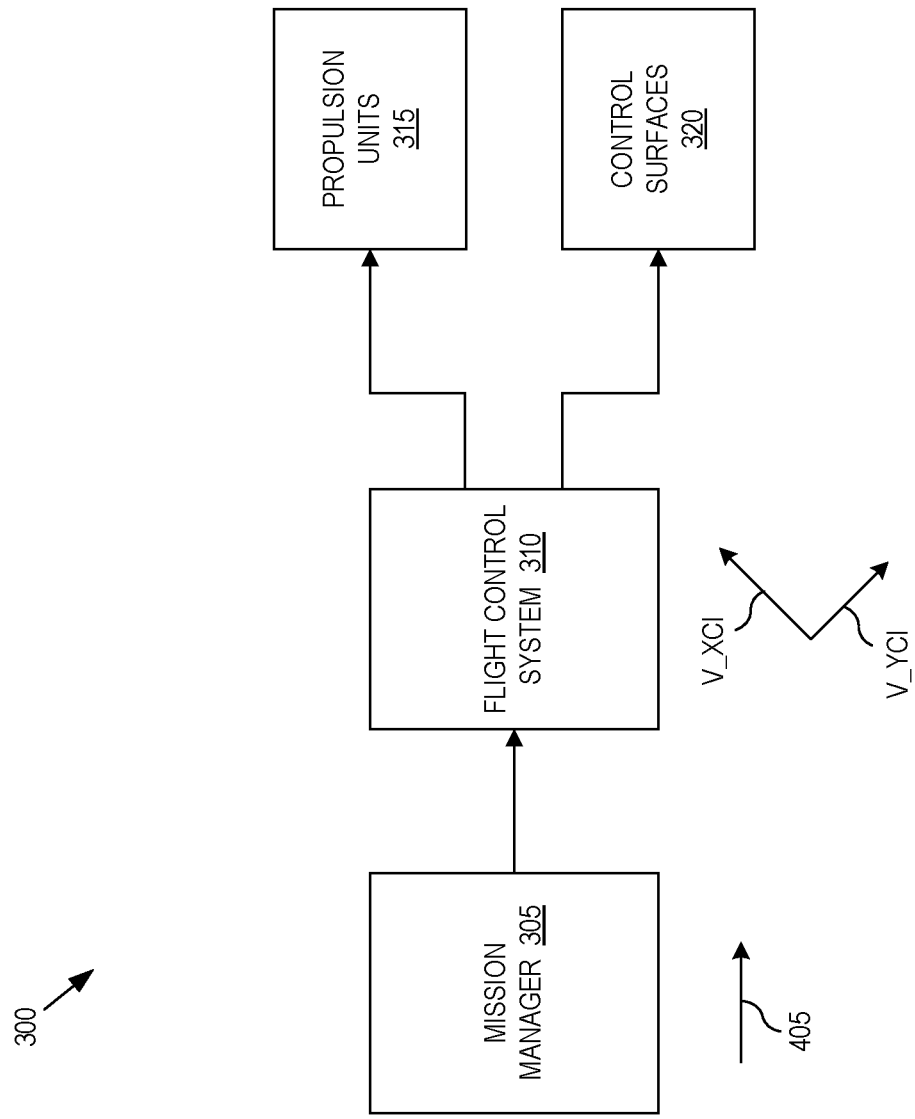
FIG. 3 is a functional block diagram illustrating a control system for the UAV, in accordance with an embodiment of the disclosure.

FIG. 3 is a functional block diagram illustrating a control system 300 for UAV 200, in accordance with an embodiment of the disclosure. The illustrated embodiment of control system includes a mission manager 305 and flight control system 310, which provide control commands to propulsion units 315 and control surfaces 320. Propulsion units 315 may include one or both of horizontal propulsion units 106 and vertical propulsion units 112. Control surfaces 320 may include any of the control surfaces including ailerons 102a and rudders 108a, or other actuated control surfaces.

Figure 4B:
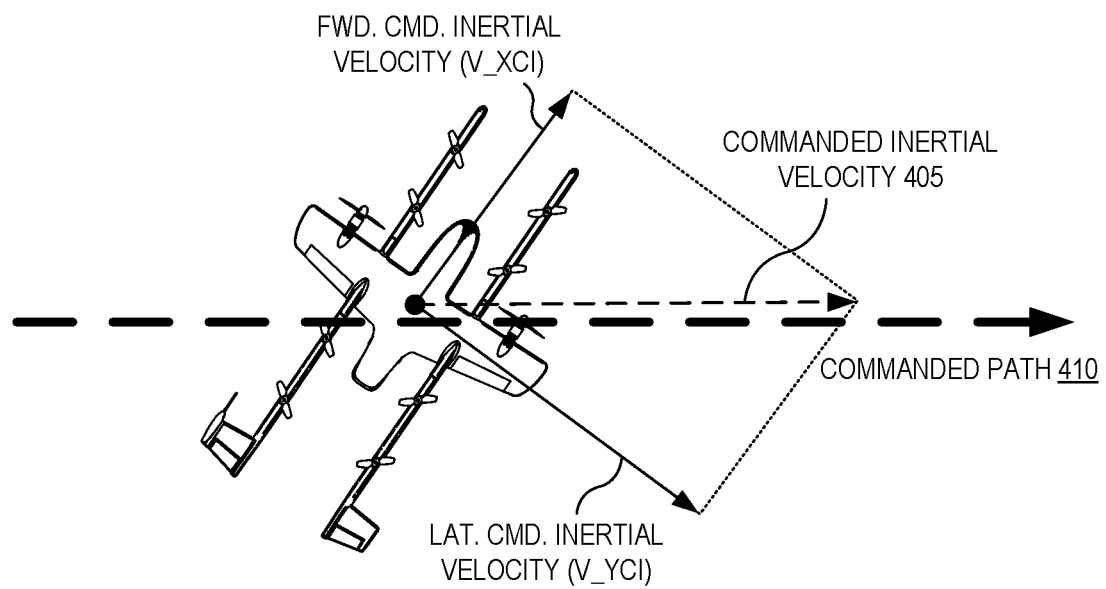
FIG. 4B illustrates a UAV having a forward axis that is misaligned with the commanded path, in accordance with an embodiment of the disclosure.

Referring to FIGS. 3 and 4B, mission manager 305 generates a commanded inertial velocity 405, which points along commanded path 410 (also generated by mission manager 305). Commanded inertial velocity 405 is a vector quantity (magnitude and direction), and should be interpreted as a commanded velocity relative to an inertial reference frame (e.g., Earth's frame of reference).

Flight control system 310 breaks down commanded inertial velocity 405 into two components: a forward commanded inertial velocity (V_xci) and a lateral commanded inertial velocity (V_yci). The "x" and "y" correspond to directions relative to the aircraft's body frame: x-forward axis 206 and y-lateral axis 207. The "c" refers to the fact that these quantities are commands, rather than estimates of a current state. The "i" refers to "inertial."

A placeholder value referred to as a "forward commanded velocity" (V_xc) is defined. In the hover mode (including acceleration and deceleration), V_xc is set to equal the forward commanded inertial velocity V_xci. However, in the cruising mode, V_xc is instead set to a fixed value associated with the cruising mode. The fixed value may be considered a commanded airspeed (as opposed to a commanded velocity with directional information) for cruising. In one embodiment, this fixed value is a preset defined parameter of the aircraft. The subscript "i" is dropped from V_xc to emphasize this distinction. With the above values and terminology established, a commanded speed (cmd_speed) may be defined as:

$$cmd\_speed = \sqrt{(V\_xc)^2 + (V\_yci)^2}. \quad \text{(Eq. 1)}$$

With the above substitution, when the UAV's forward axis (x axis) is aligned with commanded path 410 in the cruise mode (see FIG. 4A), the UAV essentially ignores commanded inertial velocity 405 and simply tracks a commanded speed (e.g., V_yci=0; cmd_speed=V_xc=present fixed value in cruising mode, which is a commanded speed, not a measured or sensed airspeed). If the UAV is less well-aligned with the direction of travel (see FIG. 4B), the forward commanded velocity V_xc remains the constant fixed value, but V_yci will grow in magnitude, and thus the value cmd_speed will also increase according to Eq. 1.

Conventionally, a flight control system references a sensed airspeed to schedule gains and allocate control effort. However, flight control system 310 instead contingently uses cmd_speed to schedule gains and allocate control effort. In one embodiment, flight control system 310 contingently references cmd_speed in lieu of sensed airspeed to inform flight control decisions according to expression 2:

$$\max(cmd\_speed, sensed\_airspeed), \quad \text{(Ex. 2)}$$

where sensed_airspeed is the airspeed as measured by an onboard sensor of the UAV. Accordingly, in one embodiment, flight control system 310 uses the maximum value selected between cmd_speed and sensed_airspeed, rather than just using a measured airspeed.

During acceleration (e.g., hover mode), using Ex. 2 to inform flight control decisions adds robustness when sensed_airspeed is artificially low due to poor alignment of the sensor with direction of travel through the airmass. The larger value of cmd_speed is instead used, which provides an appropriate value upon which to schedule gains. During constant speed cruising (e.g., cruising mode), using Ex. 2 to inform flight control decisions adds robustness when the vehicle becomes misaligned from its commanded path 410 (see FIG. 4B) due to disturbances. In this scenario, Ex. 2 provides a larger value, relative to an artificially suppressed sensed_airspeed. This larger value is more appropriate for the cruising flight.

Figure 5:
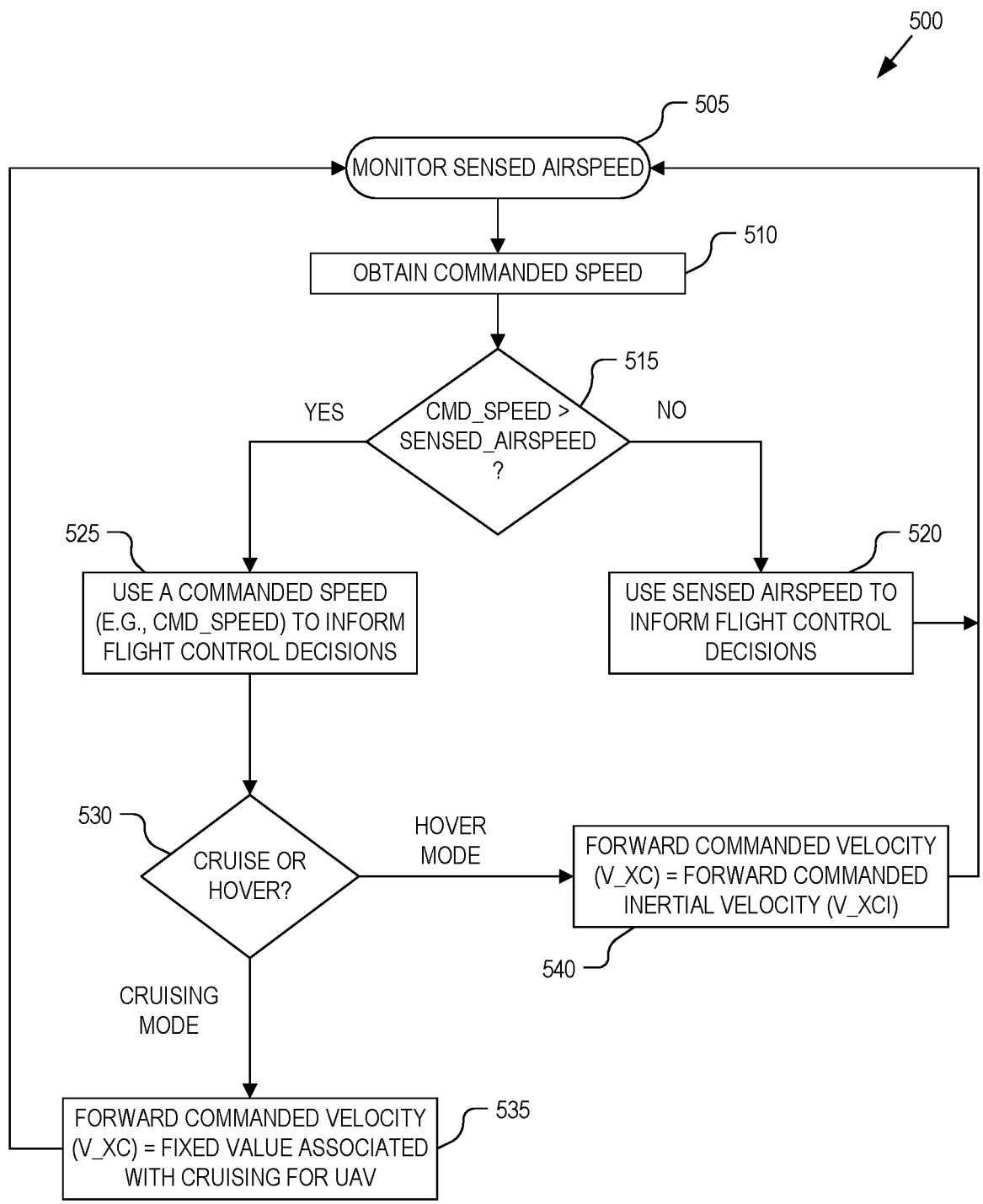
FIG. 5 is a flow chart illustrating a process for selectively substituting a commanded speed for a sensed airspeed to inform flight control decisions of the UAV, in accordance with an embodiment of the disclosure.

FIG. 5 is a flow chart illustrating a process 500 for selectively substituting a commanded speed (cmd_speed) for a sensed airspeed (sensed_airspeed) to inform flight control decisions of UAV 200, in accordance with an embodiment of the disclosure. The order in which some or all of the process blocks appear in process 500 should not be deemed limiting. Rather, one of ordinary skill in the art having the benefit of the present disclosure will understand that some of the process blocks may be executed in a variety of orders not illustrated, or even in parallel.

In a process block 505, flight control system 310 monitors the sensed airspeed (sensed_airspeed) from an onboard airspeed sensor. In a process block 510, flight control system 310 obtains the commanded speed (cmd_speed). In one embodiment, the commanded speed is calculated based upon Eq. 1. If flight control system 310 determines that sensed_airspeed is larger than cmd_speed, then process 500 continues to process block 520 where flight control system 310 uses sensed_airspeed to inform its flight control decisions to keep UAV 100 tracking commanded path 410.

However, if cmd_speed is determined to be greater than sensed_airspeed, then process 500 continues to a process block 525 and contingently uses the commanded speed (see Eq. 1) in lieu of sensed_airspeed to inform flight control decisions of UAV 200. If UAV 200 is operating in a cruising mode (decision block 530), then the forward commanded velocity (V_xc) is set to a preset fixed value associated with cruising for UAV 200 (process block 535). However, if UAV 200 is operating in a hover mode (decision block 530), then the forward commanded velocity (V_xc) is set to a forward commanded inertial velocity (V_xci) calculated by flight control system 310 as a forward component of the commanded inertial velocity 405 provided by mission manager 305. The forward component is the projection of commanded inertial velocity 405 on to commanded path 410.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method of controlling an unmanned aerial vehicle (UAV), the method comprising:
   monitoring a sensed airspeed of the UAV;
   obtaining a commanded speed for the UAV, the commanded speed representing a command to fly the UAV at a given speed relative to an airmass through which the UAV is flying or to Earth over which the UAV is flying; and
   when the commanded speed is greater than the sensed airspeed, using the commanded speed in lieu of the sensed airspeed to inform flight control decisions of the UAV.

2. The method of claim 1, further comprising:
   when the sensed airspeed is greater than the commanded speed, using the sensed airspeed instead of the commanded speed to inform the flight control decisions of the UAV.

3. The method of claim 1, wherein the flight control decisions include at least one of:
   scheduling thrust for propulsion of the UAV, or
   allocating control effort for a control surface of the UAV.

4. The method of claim 1, wherein the sensed airspeed of the UAV comprises a measurement of airspeed as sensed by an onboard sensor of the UAV during flight.

5. The method of claim 1, wherein obtaining the commanded speed for the UAV comprises calculating the commanded speed (cmd_speed) as:

$$\mathrm{cmd\_speed} = \sqrt{(V\_xc)^2 + (V\_yci)^2},$$

where V_xc represents a forward commanded velocity for the UAV and V_yci represents a lateral commanded inertial velocity for the UAV, the lateral commanded inertial velocity calculated as a lateral component of a commanded inertial velocity that points along a commanded path for the UAV.

6. The method of claim 5, further comprising:
   when the UAV is operating in a cruising mode, setting the forward commanded velocity to a fixed value associated with the cruising mode for the UAV.

7. The method of claim 6, further comprising:
   when the UAV is operating in a hover mode, setting the forward commanded velocity to a forward commanded inertial velocity for the UAV calculated as a forward component of the commanded inertial velocity that points along the commanded path for the UAV.

8. The method of claim 7, wherein the hover mode includes accelerating to the cruising mode and deaccelerating from the cruising mode.

9. The method of claim 1, wherein the UAV comprises a vertical takeoff and landing (VTOL) UAV including at least one vertical propulsion unit and at least one horizontal propulsion unit.

10. At least one machine-accessible storage medium that provides instructions that, when executed by a control system of an unmanned aerial vehicle (UAV), will cause the UAV to perform operations comprising:
    monitoring a sensed airspeed of the UAV;
    obtaining a commanded speed for the UAV, the commanded speed representing a command to fly the UAV at a given speed relative to an airmass through which the UAV is flying or to Earth over which the UAV is flying; and
    when the commanded speed is greater than the sensed airspeed, using the commanded speed in lieu of the sensed airspeed to inform flight control decisions of the UAV.

11. The at least one machine-accessible storage medium of claim 10, further providing instructions that, when executed by the control system, will cause the UAV to perform further operations, comprising:
    when the sensed airspeed is greater than the commanded speed, using the sensed airspeed instead of the commanded speed to inform the flight control decisions of the UAV.

12. The at least one machine-accessible storage medium of claim 10, wherein the flight control decisions include at least one of:
    scheduling thrust for propulsion of the UAV, or
    allocating control effort for a control surface of the UAV.

13. The at least one machine-accessible storage medium of claim 10, wherein the sensed airspeed of the UAV comprises a measurement of airspeed as sensed by an onboard sensor of the UAV during flight.

14. The at least one machine-accessible storage medium of claim 10, wherein obtaining the commanded speed for the UAV comprises calculating the commanded speed (cmd_speed) as:

$$\mathrm{cmd\_speed} = \sqrt{(V\_xc)^2 + (V\_yci)^2},$$

where V_xc represents a forward commanded velocity for the UAV and V_yci represents a lateral commanded inertial velocity for the UAV calculated as a lateral component of a commanded inertial velocity that points along a commanded path for the UAV.

15. The at least one machine-accessible storage medium of claim 14, further providing instructions that, when executed by the control system, will cause the UAV to perform further operations, comprising:
when the UAV is operating in a cruising mode, setting the forward commanded velocity to a fixed value associated with the cruising mode for the UAV.

16. The at least one machine-accessible storage medium of claim 15, further providing instructions that, when executed by the control system, will cause the UAV to perform further operations, comprising:
when the UAV is operating in a hover mode of the drone mission, setting the forward commanded velocity to a forward commanded inertial velocity for the UAV calculated as a forward component of the commanded inertial velocity that points along the commanded path for the UAV.

17. An unmanned aerial vehicle (UAV), comprising:
a control surface to influence one or more of a pitch, a yaw, or a roll of the UAV;
a propulsion unit to propel the UAV;
a sensor to measure an airspeed of the UAV and in response output a sensed airspeed for the UAV; and
a control system coupled to the control surface, the propulsion unit, and the sensor, the control system including logic that when executed by the control system causes the UAV to perform operations including:
obtaining a commanded speed for the UAV, the commanded speed representing a command to fly the UAV at a given speed relative to an airmass through which the UAV is flying or to Earth over which the UAV is flying; and
when the commanded speed is greater than the sensed airspeed, using the commanded speed in lieu of the sensed airspeed to inform flight control decisions of the UAV, wherein the flight control decisions include at least one of scheduling thrust for the propulsion unit or allocating control effort for the control surface.

18. The UAV of claim 17, wherein the control system includes further logic that when executed by the control system causes the UAV to perform further operations including:
when the sensed airspeed is greater than the commanded speed, using the sensed airspeed instead of the commanded speed to inform the flight control decisions of the UAV.

19. The UAV of claim 17, wherein obtaining the commanded speed for the UAV comprises calculating the commanded speed (cmd_speed) as:

$$cmd\_speed = \sqrt{(V\_xc)^2 + (V\_yci)^2},$$

where V_xc represents a forward commanded velocity for the UAV and V_yci represents a lateral commanded inertial velocity for the UAV, the lateral commanded inertial velocity calculated as a lateral component of a commanded inertial velocity that points along a commanded path for the UAV.

20. The UAV of claim 19, wherein the control system includes further logic that when executed by the control system causes the UAV to perform further operations including:
when the UAV is operating in a cruising mode, setting the forward commanded velocity to a fixed value; and
when the UAV is operating in a hover mode of the drone mission, setting the forward commanded velocity to a forward commanded inertial velocity for the UAV calculated as a forward component of the commanded inertial velocity that points along the commanded path for the UAV.

* * * * *